(No Model.)
J. R. BURNEY.
WHEEL RIM AND TIRE ADJUSTER.
No. 304,608. Patented Sept. 2, 1884.
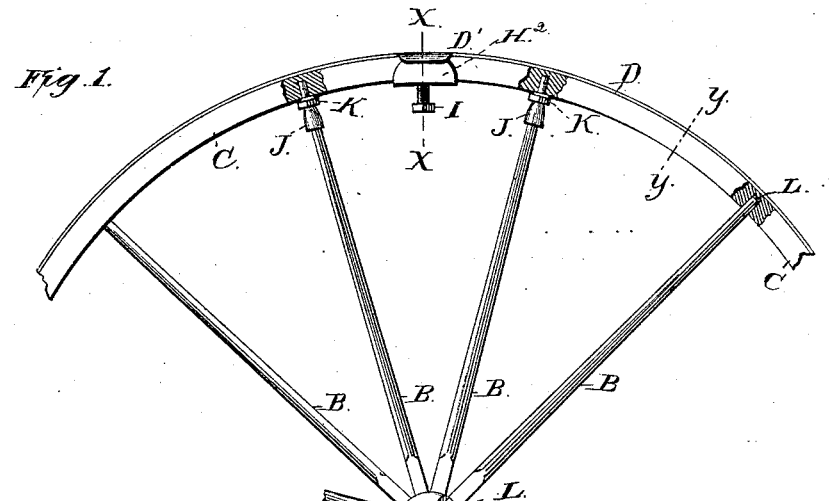
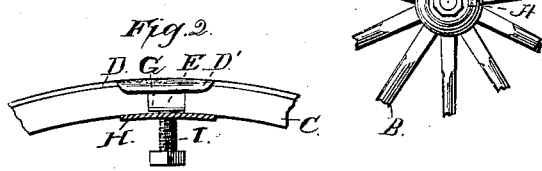
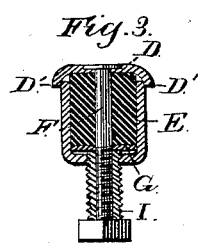
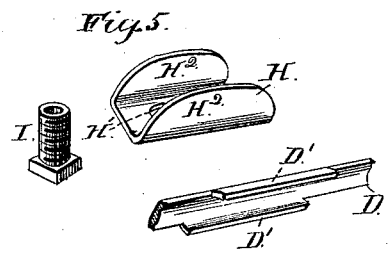
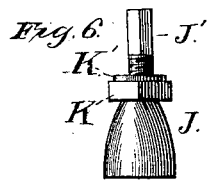
Witnesses:
N. A. Clark.
P. B. Turpin.
Inventor
John R. Burney
By R. S. & A. P. Lacey
Attys

United States Patent Office.

JOHN R. BURNEY, OF MACON, NORTH CAROLINA.

WHEEL RIM AND TIRE ADJUSTER.

SPECIFICATION forming part of Letters Patent No. 304,608, dated September 2, 1884.

Application filed December 6, 1883. (No model.)

*To all whom it may concern:*

Be it known that I, JOHN R. BURNEY, a citizen of the United States, residing at Macon, in the county of Warren and State of North Carolina, have invented certain new and useful Improvements in Wheels, of which the following is a specification, reference being had therein to the accompanying drawings.

My invention relates to improvements in wheels, and has for its object to provide devices whereby to compensate for the expansion and contraction of the fellies with the wetting and drying of the wheel.

It consists in a rubber block or equivalent elastic support interposed between the ends of the felly-sections.

It consists, further, in a rubber block held between the ends of the adjacent fellies, combined with means for compressing said rubber block.

It consists, further, in providing devices for preventing lateral spreading of the rubber block, combined with means for compressing said block.

It consists, further, in other improvements, all of which will be hereinafter described, and specified in the claims.

In the drawings, Figure 1 is a side view of a section of a wheel. Fig. 2 is a detail view of the felly-joint, the boxing being broken away in section. Fig. 3 is a cross-section on line $x$ $x$, Fig. 1. Fig. 4 is a cross-section on line $y$ $y$, Fig. 1. Fig. 5 shows the tire, boxing, and screw-sleeve in detail. Fig. 6 is a detail view of spoke-end.

The hub A may be of ordinary construction, and the spokes B radiate therefrom to the felly C, which is preferably made in sections, the meeting ends whereof are set slightly apart, providing a space or interval to receive the elastic block presently described. The felly is made convex on its outer edge, and the tire D is made correspondingly concave, as most clearly shown in Fig. 4, in order to better hold the felly and tire together. Flanges D' D' are projected down from the opposite sides of the tire over the joint of the felly-sections.

The block E is preferably made of rubber; but it will be understood that it may be made of any other equivalent elastic substance and the same results will be had. Normally the block fits longitudinally the space between the ends of the adjacent felly-sections and extends up under the flanges D', as will be seen from Fig. 3. A screw, F, is passed through the tire and block E, and extends inward beyond the felly, and its inner end is threaded, as shown. The head of this screw should be secured in an angular socket in the tire, or otherwise suitably keyed thereto. A follower-plate, G, is placed against the inner side of the rubber block and provided with an opening, through which the screw F passes.

The boxing H is made in the U shape shown, and fits over the felly, covering the rubber block and the joint, as will be seen from Fig. 2. Its base-plate is perforated at H' to receive the screw or nut I, which is provided with an external and an internal thread. The latter turns on the thread end of screw F, while the former turns in the opening H' of the boxing H. The wings $H^2$ of the boxing fit closely up under flanges D' of the tire, and are held thereby from being forced laterally when tension is applied to the rubber block in the manner presently described. It will be seen that by turning the screw sleeve or nut I in it will bear against the follower-plate G and compress the rubber block. The latter is prevented from expanding laterally by the wings $H^2$ of the boxing. Thus its entire expansion is in a longitudinal direction, and the felly-sections are forced apart, and the felly tightened to the extent the sleeve is turned in. If the sleeve be turned out, the opposite result is had. As shown in Fig. 3, there is usually a small space between the base-plate of the boxing and the follower-plate. In this space I usually place a lump of grease, which lubricates the screws F I and prevents moisture getting at the rubber block and injuring same.

It will be understood that various devices may be provided to prevent lateral spreading of the rubber block instead of the boxing shown. For instance, the flanges D' could be extended down the full thickness of the felly and would perform the desired function. I prefer, however, to use the boxing, as thereby the several parts are conveniently applied, and a casing or covering for the rubber, &c., is provided. I also prefer the use of the compressing-nut, screw, &c., as shown. It is obvious, however, that other means could be provided for compressing the rubber block—as, for example, a lever pivoted on the inner side of the felly and having one end arranged to bear against the rubber block and its other or power end adapted to engage a rack or other suitable device, whereby it could be held at any desired point of adjustment.

My invention, it will be understood, applies to farm as well as road vehicles, and aims to construct a wheel the rim of which can be tightened or loosened up, as desired, or may be required by the weather or other influences, as is understood. Good results will be had by the use of the elastic block alone, independent of devices for compressing and spreading same, but I prefer to employ such devices, as hereby the block may be spread to any longitudinal extent desired and better results generally secured. Ordinarily the slight increase of circumference of the rim incident to the expansion thereof, before described, will not affect the spokes. However, in some cases it does, and causes the spokes to become loose. In order to obviate this, I employ the sockets J, having the stems J', which in the present instance are made angular on their outer ends and fit into the rim. The portion of these stems next the socket is threaded to receive the nut K. A washer, K', is interposed between the nut and rim, to prevent injury to the latter as the nut is turned up. The outer end of the spoke fits in this socket against a cushion of rubber, and a similar cushion of rubber is placed in the base of the spoke-mortise formed in the hub. It will be seen that by turning nut K the spoke may be practically lengthened with the adjustment of the rim previously described.

Instead of arranging the adjustable socket at the outer end of the spoke, it will be understood it could be arranged at the inner end thereof and operate in the hub. Any number desired of these sockets may be employed. Ordinarily one of these sockets on each side of each felly-joint is sufficient. The spokes on which the sockets J are not used I fit in mortises formed as usual in the felly and hub, and at the base of these mortises I place a cushion of rubber, L, as shown, so as to prevent injury to the ends of the spoke by jars and jolts while on the road.

Having thus described my invention, what I claim, and desire to secure by Letters Patent, is—

1. In a wheel, the combination of the fellies having their ends slightly separated, an elastic supporting-block placed between said ends, and means for compressing the elastic block, whereby the said block may be expanded in line with and against the proximate ends of the fellies, substantially as set forth.

2. In a wheel, the combination of the fellies, an elastic block placed and bearing between and against the proximate ends of the said fellies, means for preventing the lateral spreading of the elastic block, and means for compressing the said block, whereby it may be expanded in line with and against the ends of the fellies, substantially as and for the purposes specified.

3. In a wheel, the combination of the fellies, the tire having inwardly-projected side flanges at the joint of the fellies, the rubber block placed between the ends of the adjacent fellies, the boxing placed over the said block and having the ends of its wings inserted under the flanges of the tire, the screw, and a suitable compressing-nut, substantially as set forth.

4. The wheel, substantially as described and shown, composed of the hub, the spokes, the fellies, the tire having side flanges projected inwardly over the joint of the fellies, a rubber block placed between the ends of the fellies, the boxing placed over the rubber block and having its ends inserted under the flanges of the tire, the screw held to or formed on the tire, the follower-plate, and the compressing sleeve-nut, substantially as set forth.

In testimony whereof I affix my signature in presence of two witnesses.

JOHN R. BURNEY.

Witnesses:
  JNO. WHITE,
  GEO. C. FITTS.